United States Patent
Parviainen

(10) Patent No.: US 6,787,934 B2
(45) Date of Patent: Sep. 7, 2004

(54) TURBINE SYSTEM

(76) Inventor: Pentti Henrik Parviainen, 106 - 2230 Harrison Dr., Vancouver, British Columbia (CA), V5P 2P6

( * ) Notice: Subject to any disclaimer, the term of this patent is extended or adjusted under 35 U.S.C. 154(b) by 211 days.

(21) Appl. No.: 10/062,526

(22) Filed: Feb. 5, 2002

(65) Prior Publication Data

US 2003/0146627 A1 Aug. 7, 2003

(51) Int. Cl.[7] .................................. F03D 3/04
(52) U.S. Cl. ........................ 290/55; 290/54; 290/43; 415/104; 415/106
(58) Field of Search ............. 290/54, 55, 53, 290/43; 415/104, 106; 60/398; 416/240, 242, 237

(56) References Cited

U.S. PATENT DOCUMENTS

| | | | |
|---|---|---|---|
| 3,038,307 A | * | 6/1962 | Oprecht ...................... 60/792 |
| 3,619,678 A | | 11/1971 | Ruof |
| 3,771,032 A | | 11/1973 | Hender |
| 3,831,049 A | | 8/1974 | Korotenko et al. |
| 3,938,907 A | * | 2/1976 | Magoveny et al. ......... 415/141 |
| 4,056,746 A | | 11/1977 | Burtis |
| 4,357,563 A | | 11/1982 | Ohno |
| 4,401,939 A | | 8/1983 | Korbell |
| 4,625,160 A | | 11/1986 | Hucker |
| 4,644,206 A | | 2/1987 | Smith |
| 4,661,737 A | | 4/1987 | Barri |
| 5,089,734 A | | 2/1992 | Bickraj |
| 5,262,693 A | | 11/1993 | Holka |
| 5,376,827 A | * | 12/1994 | Hines ........................... 290/52 |
| 5,664,418 A | * | 9/1997 | Walters ........................ 60/398 |
| 5,852,331 A | * | 12/1998 | Giorgini ....................... 290/55 |
| 5,856,719 A | | 1/1999 | De Armas |
| 5,994,811 A | | 11/1999 | Thomassen |
| 6,118,202 A | | 9/2000 | Pinkerton |
| 6,175,178 B1 | | 1/2001 | Tupper et al. |
| 6,448,669 B1 | * | 9/2002 | Elder ........................... 290/54 |
| 6,518,680 B2 | * | 2/2003 | McDavid, Jr. ............... 290/54 |
| 2003/0025334 A1 | * | 2/2003 | McDavid ..................... 290/54 |

OTHER PUBLICATIONS

Ozgur et al., "A Study of Contrarotating Turbines Based on Design Efficiency", Journal of Basic Engineering. Sep. 1971, pp. 395–404.

* cited by examiner

Primary Examiner—Nicholas Ponomarenko
Assistant Examiner—Heba Y. Elkassabgi
(74) Attorney, Agent, or Firm—Dyen Wiggs Green & Mutala

(57) ABSTRACT

A turbine has a first rotating portion configured to rotate about an axis and a second rotating portion configured to rotate about the same axis. The first rotating portion has a plurality of first fluid outlets, and, the second rotating portion has a plurality of second fluid outlets proximate to the first fluid outlets. The outlets are configured so that when a fluid flows out the first fluid outlets, the first rotating portion rotates in a first sense, and the fluid is forced out the second fluid outlets, thereby causing the second rotating portion to rotate in a sense opposite to the first sense. The first and second rotating portions may be connected to drive an electrical generator. The generator and the rotating portions may all be configured to rotate about a single axis, and may all be supported by bearings. As one skilled in the art will appreciate, in a system constructed according to the invention, a higher speed of relative rotation between the armature and field can be achieved than in a system wherein only either the field or the armature rotates, resulting in improved efficiency in the conversion of fluid energy to electric power.

18 Claims, 4 Drawing Sheets

TURBINE SYSTEM

TECHNICAL FIELD

The invention relates to turbine systems in which flowing fluid causes a turbine to rotate. The invention may be applied in electric power generation.

BACKGROUND

One way to generate electrical power is to use flowing fluid such as water or steam, or a combination thereof, to drive a turbine. The turbine produces rotational energy which may be used to drive an electrical generator. In some systems, the turbine is connected to an armature, such that, as the fluid causes the turbine to rotate, the armature rotates relative to a field produced by permanent magnets or electromagnets. In other systems, the turbine is connected to the field, and the rotation of the turbine causes the field to rotate relative to the armature. This rotation produces an electromotive force in the armature that is proportional to the speed of relative rotation of the armature and the field, which causes a current to flow in the armature.

There exists a need to increase the efficiency with which the energy in a flowing fluid can be converted into mechanical (rotational) energy.

SUMMARY OF INVENTION

Once a flowing fluid exits a conventional turbine it is generally still moving at a high velocity. There exists a need to harness the kinetic energy of the fluid escaping from the turbine.

The invention provides a turbine comprising a first rotating portion configured to rotate about an axis, the first rotating portion comprising a plurality of first fluid outlets, and, a second rotating portion configured to rotate about the same axis, the second rotating portion comprising a plurality of second fluid outlets proximate to the first fluid outlets on the first rotating portion. When a high pressure fluid is directed out the first fluid outlets, the first rotating portion rotates in a first sense, and the high pressure fluid is forced out said second fluid outlets, thereby causing said second rotating portion to rotate in a sense opposite to said first sense.

The second fluid outlets may be positioned outwardly from the first fluid outlets. The first rotating portion may comprise first baffles which define the first fluid outlets. The second rotating portion may comprise second baffles which define the second fluid outlets. The baffles may be curved.

The invention also provides an electrical power system comprising a generator driven by a turbine according to the invention. The generator may comprise an armature and a field. The first rotating portion may be connected to drive the armature and the second rotating portion may be connected to drive the field, so that when a high pressure fluid is directed out said first fluid outlets, the armature rotates in a first sense, and the high pressure fluid is forced out the second fluid outlets, thereby causing the field to rotate in a sense opposite to the first sense.

The invention also provides an electrical power system as described above wherein the first rotating portion is connected to drive the field and the second rotating portion is connected to drive the armature.

The invention further provides a method of generating counter-rotation comprising providing a turbine comprising a first rotating portion and a second rotating portion, both of which are configured to rotate about a single axis, and forcing a high pressure fluid through the turbine. The high pressure fluid causes said first rotating portion to rotate in a first sense, and causes the second rotating portion to rotate in a sense opposite to the first sense.

The invention still further provides a method of generating electricity comprising generating counter-rotation by the above method, and, providing a generator comprising an armature and a field, the armature connected to be driven by the first rotating portion and the field connected to be driven by the second rotating portion. The counter-rotation causes the armature and field to rotate in opposite senses.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention provides a turbine which may be used in an electrical power system including a generator comprising a field and an armature. The turbine comprises first and second rotating portions connected to drive the field and the armature in counter-rotation relative to each other. The first and second rotating portions may be non-rotationally attached to the armature and field, or they may be connected to the armature and field by a system of gears. As one skilled in the art will appreciate, there are many ways to connect two rigid bodies so that the rotational energy of one is transferred to the other, all of which are to be understood to be within the spirit and scope of the invention.

It does not matter which of the field and armature are driven by which portion, as long as one portion is driving the field and the other is driving the armature. Fluid from a reservoir is delivered to the turbine by conventional means. The fluid flows out of the first rotating portion through first fluid outlets, causing the first rotating portion to rotate in one direction. The fluid is then directed through and out second fluid outlets on the second rotating portion, causing the second rotating portion to rotate in the opposite direction. The fluid outlets may have a variety of configurations which result in the desired counter-rotation of the first and second rotating portions. To avoid obscuring the invention, only some of the many possible configurations of the fluid outlets within the spirit and scope of the invention have been described below. As one skilled in the art of turbine design will appreciate, the configuration of the fluid outlets will depend on the conditions in which the turbine is to be used, such as fluid pressure and flow rate. The fluid could be either liquid or gaseous, or a combination of the two.

The novel system of the invention converts the flow of the fluid into counter-rotational motion of the first and second rotating portions of the turbine. The configuration of the first and second rotating portions is such that the kinetic energy of the fluid escaping from the first rotating portion is used to rotate the second rotating portion.

As one skilled in the art will appreciate, in a system constructed according to the invention, a higher speed of relative rotation between the armature and field can be achieved than in a system wherein only either the field or the armature rotates, if the maximum speed of rotation relative to the ground is the same in both systems.

Figure 1:
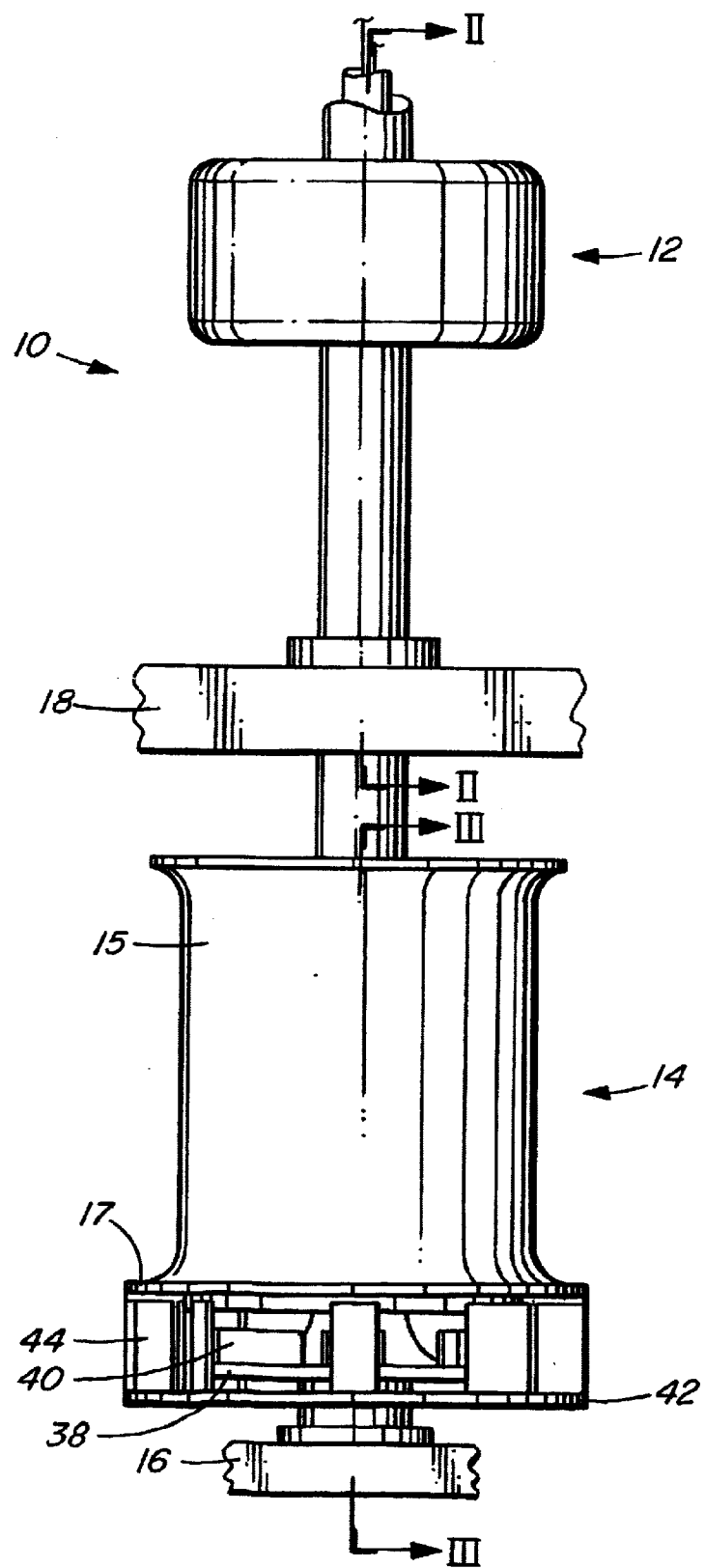
FIG. 1 is an elevation view of an electrical power system including a generator and turbine according to one embodiment of the invention.

FIG. 1 shows an electrical power system 10 comprising a generator 12 driven by a turbine 14. In a typical installation, as shown in FIG. 1, system 10 may be mounted on a base 16, and may extend through a floor 18, with generator 12 above floor 18 and turbine 14 below floor 18. Other configurations of system 12 are equally possible, and are understood to be within the scope and spirit of the invention.

Figure 2:
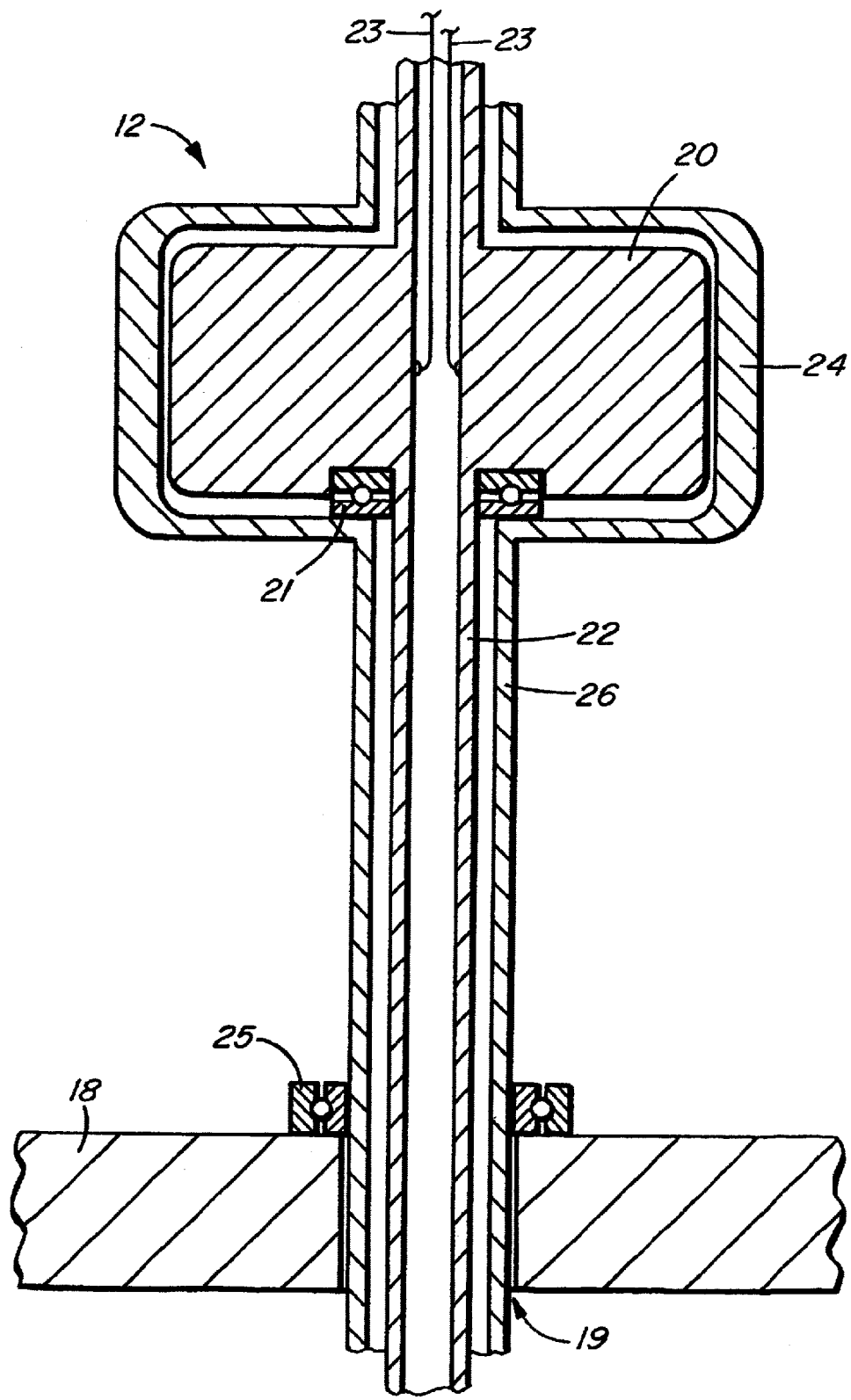
FIG. 2 is a sectional view of the generator taken along the line II—II of FIG. 1.

As shown in FIG. 2, generator 12 comprises an inner portion 20 and an outer portion 24. In the embodiment shown, inner portion 20 comprises an armature coil and outer portion 24 comprises a field, which may be produced by permanent magnets or electromagnets. Alternatively, inner portion 20 could comprise the field and outer portion 24 could comprise the armature. Conductors 23 are electrically connected to the armature to carry electricity produced by generator 12 to another location. Inner portion 20 is driven in rotation by inner shaft 22, and outer portion 24 is driven in rotation by outer shaft 26. Bearings 21 support inner portion 20 and shaft 22 and permit inner portion 20 and shaft 22 relative to outer portion 24 and shaft 26. Outer portion 24 and shaft 26 are supported, and permitted to rotate relative to floor 18, by bearings 25. An aperture 19 in floor 18 allows shafts 22 and 26 to pass therethrough.

Figure 3:
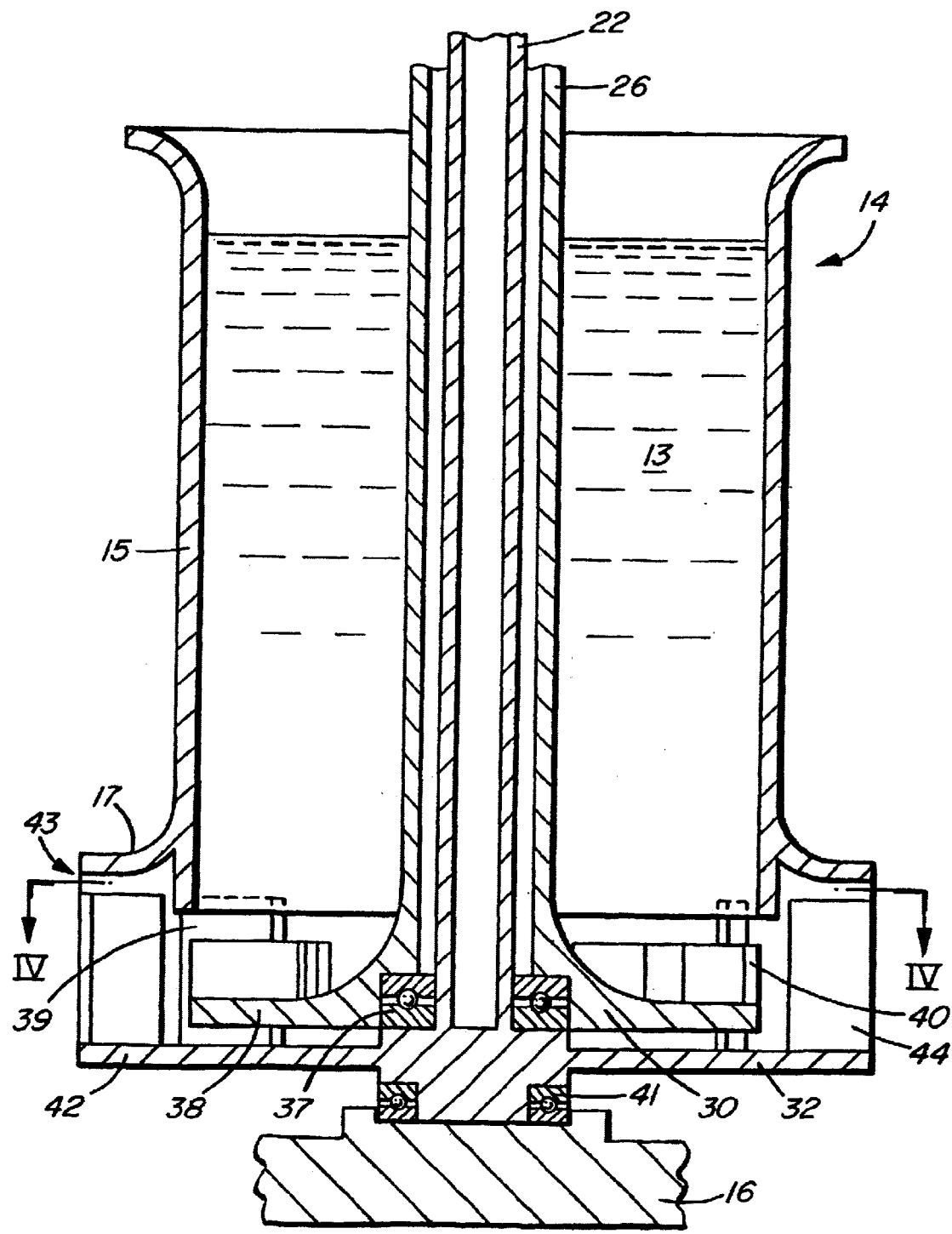
FIG. 3 is a sectional view of the turbine taken along the line III—III of FIG. 1.
Figure 4:
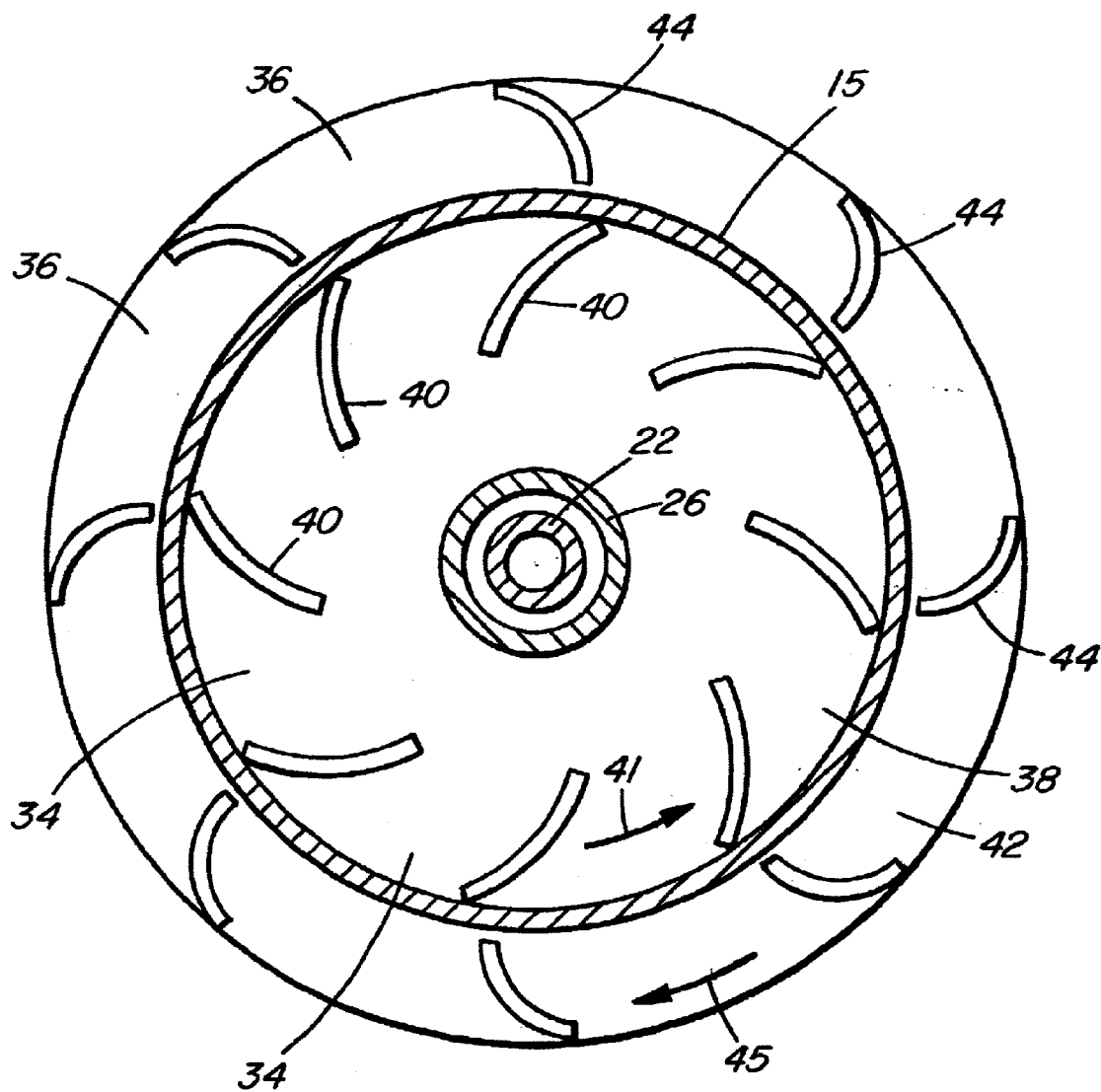
FIG. 4 is a sectional view of the turbine taken along the line IV—IV of FIG. 3.

As shown in FIGS. 3 and 4, turbine 14 comprises a first rotating portion 30 and a second rotating portion 32 within a housing 15. First rotating portion 30 comprises a plurality of first fluid outlets 34, and second rotating portion 32 comprises a plurality of second fluid outlets 36. A preferred configuration of first fluid outlets 34 and second fluid outlets 36 is described below with reference to FIG. 4.

In the embodiment shown, first rotating portion 30 is coupled to drive outer shaft 26, and second rotating portion 32 is coupled to drive inner shaft 22. First rotating portion 30 comprises a disc 38. First baffles 40 are mounted on disc 38, and define first fluid outlets 34, as described below. Second rotating portion 32 comprises a disc 42. Second baffles 44 are mounted on disc 42, and define second fluid outlets 36, as described below.

Disc 42 is mounted on base 16 by bearings 41 to allow second rotating portion 32 to rotate. Likewise, disc 38 is mounted on disc 42 by bearings 37, allowing first rotating portion 30 to rotate.

Turbine 14 further comprises a housing 15, which is filled with fluid 13. Housing 15 comprises a cylinder with a flange 17 formed near a lower end thereof. In operation, fluid 13 from a reservoir (not shown) is delivered to turbine 14 by conventional means (not shown). The fluid 13 flows through housing 15 toward disc 38 and out through first fluid outlets 34 formed by first baffles 40.

There are gaps 39 between first baffles 40 and housing 15 to allow first rotating portion 30 to rotate freely within housing 15. Likewise, there are gaps 43 between second baffles 44 and flange 17 to allow second rotating portion 32 to rotate freely within housing 15.

As shown in FIG. 4, first baffles 40 in this embodiment have a first curvature which causes first rotating portion 30 to rotate in a first sense indicated by arrow 41 as fluid 13 exits first fluid outlets 34. Once fluid 13 exits first fluid outlets 34 it is forced out through second fluid outlets 36 defined by second baffles 44. As shown in FIG. 4, second baffles 44 in this embodiment have a second curvature opposite to the first curvature which causes second rotating portion 32 to rotate in a second sense, which is opposite to the first sense, as indicated by arrow 45 as fluid 13 exits second fluid outlets 36.

First and second fluid outlets 34, 36 could be defined by elements other than baffles 40, 44. For example, first fluid outlets 34 could comprise tangentially oriented nozzles which direct the fluid so that first rotating portion 30 rotates in a first sense, and second fluid outlets 36 could be defined by a cylindrical shell with flanges on the inside thereof, so that as the fluid exits the nozzles it strikes the flanges and causes second rotating portion to rotate in a second sense. Other variations of first and second fluid outlets 34, 36 are equally possible without departing form the scope and spirit of the invention.

As will be apparent to those skilled in the art in the light of the foregoing disclosure, many alterations and modifications are possible in the practice of this invention without departing from the spirit or scope thereof. For example:

the number and shape of the baffles could be altered;

the fluid outlets could be defined by elements other than baffles, such as nozzles and flanges, propellor blades, or the like;

the armature could be in the outer portion of the generator and the field could be in the inner portion.

Accordingly, the scope of the invention is to be construed in accordance with the substance defined by the following claims.

What is claimed is:

1. A turbine comprising:
   (a) a first rotating portion configured to rotate about an axis, the first rotating portion comprising a plurality of first fluid outlets;
   (b) a second rotating portion configured to rotate about said axis, the second rotating portion comprising a plurality of second fluid outlets proximate to said plurality of first fluid outlets on the first rotating portion, wherein the second fluid outlets are positioned radially outwardly from the first fluid outlets; and,
   c) a base comprising a first set of bearings for supporting said first rotating portion and a second set of bearings for supporting said second rotating portion, such that said first rotating portion and said second rotating portion rotate freely with respect to said base, wherein when a fluid is directed out said first fluid outlets, said first rotating portion rotates in a first sense, and said fluid is directed out said second fluid outlets, thereby causing said second rotating portion to rotate in a sense opposite to said first sense.

2. The turbine of claim 1 wherein the first rotating portion is positioned concentrically with respect to said second rotating portion and wherein the axis is vertically oriented.

3. The turbine of claim 1 wherein the first rotating portion comprises first baffles which define the first fluid outlets.

4. The turbine of claim 3 wherein the first baffles have a first curvature.

5. The turbine of claim 4 wherein the second rotating portion comprises second baffles which define the second fluid outlets.

6. The turbine of claim 5 wherein the second baffles have a second curvature opposite to the first curvature.

7. An electrical power system comprising the turbine of claim 1 and a generator, the generator comprising an armature coupled to said first rotating portion and a field coupled to said second rotating portion and positioned concentrically with respect to said armature, so that when a high pressure fluid is directed out said first fluid outlets, said armature rotates freely in said first sense, and said high pressure fluid is forced out said second fluid outlets, thereby causing said field to rotate freely in said sense opposite to said first sense.

8. The electrical power system of claim 7 comprising:
   (a) a separator positioned between the turbine and the generator, the separator defining an aperture for allowing the first and second shafts to pass therethrough;
   (b) a third set of bearings coupled to the separator for supporting the first shaft; and,
   (c) a fourth set of bearings coupled to the first shaft for supporting the second shaft.

9. The electrical power system of claim 8 wherein the axis is vertically oriented.

10. The electrical power system of claim 9 wherein the separator comprises a floor and wherein the generator is positioned above the floor and the turbine is positioned below the floor.

11. The electrical power system of claim 7 wherein the first rotating portion comprises baffles which define the first fluid outlets.

12. The electrical power system of claim 7 wherein the second rotating portion comprises baffles which define the second fluid outlets.

13. An electrical power system comprising the turbine of claim 1 and a generator, the generator comprising an armature coupled to said second rotating portion and a field coupled to said first rotating portion and positioned concentrically with respect to said armature, so that when a high pressure fluid is directed out said first fluid outlets, said field rotates freely in said first sense, and said high pressure fluid is forced out said second fluid outlets, thereby causing said armature to rotate freely in said sense opposite to said first sense.

14. The electrical power system of claim 13 comprising:
   (a) a separator positioned between the turbine and the generator, the separator defining an aperture for allowing the first and second shafts to pass therethrough;
   (b) a third set of bearings coupled to the separator for supporting the first shafts; and
   (c) a fourth set of bearings coupled to the first shaft for supporting the second shaft.

15. The electrical power system of claim 14 wherein the axis is vertically oriented.

16. The electrical power system of claim 15 wherein the separator comprises a floor and wherein the generator is positioned above the floor and the turbine is positioned below the floor.

17. The electrical power system of claim 13 wherein the first rotating portion comprises baffles which define the first fluid outlets.

18. The electrical power system of claim 13 wherein the second rotating portion comprises baffles which define the second fluid outlets.

* * * * *